US010774988B2

(12) United States Patent
Holman et al.

(10) Patent No.: US 10,774,988 B2
(45) Date of Patent: Sep. 15, 2020

(54) VENT VALVE (71) Applicant: Graco Minnesota Inc., Minneapolis, MN (US)

(72) Inventors: John C. Holman, Ham Lake, MN (US); Brandon T. Gustafson, Deephaven, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 456 days.

(21) Appl. No.: 15/568,278

(22) PCT Filed: Apr. 22, 2016

(86) PCT No.: PCT/US2016/028899
§ 371 (c)(1),
(2) Date: Oct. 20, 2017

(87) PCT Pub. No.: WO2016/172518
PCT Pub. Date: Oct. 27, 2016

(65) Prior Publication Data
US 2018/0142835 A1  May 24, 2018

Related U.S. Application Data (60) Provisional application No. 62/151,593, filed on Apr. 23, 2015, provisional application No. 62/154,222, (Continued)

(51) Int. Cl.
*F16N 13/22* (2006.01)
*F16K 31/18* (2006.01)
(Continued)

(52) U.S. Cl.
CPC ........... *F16N 13/22* (2013.01); *F04B 23/025* (2013.01); *F04B 49/04* (2013.01); *F04B 53/06* (2013.01);
(Continued)

(58) Field of Classification Search
CPC .......... F16N 13/22; F16N 7/385; F16K 21/18; F16K 31/18; F04B 49/025; F04B 23/025; F04B 49/04
See application file for complete search history.

(56) References Cited

U.S. PATENT DOCUMENTS 1,648,756 A   11/1927  Cherry
1,728,464 A    9/1929  Young
(Continued)

FOREIGN PATENT DOCUMENTS

CN         2596172 Y    12/2003
CN       202647153 U     1/2013
(Continued)

OTHER PUBLICATIONS

Third Chinese Office Action for CN Application No. 201680023510.8, dated Sep. 5, 2019, pp. 10.
(Continued)

*Primary Examiner* — Michael R Mansen
*Assistant Examiner* — Mark K Buse
(74) *Attorney, Agent, or Firm* — Kinney & Lange, P.A.

(57) ABSTRACT

A vent valve for an actuator disposed in a lubricant reservoir includes a bore extending through the plate, a seal disposed within the bore proximate a top surface of the plate, a retaining member extending about a lower opening of the bore, and a ball disposed within the bore between the seal and the retaining member. The vent valve is configured to allow air to pass from a lower portion of a lubricant reservoir as lubricant fills the lower portion. The vent valve also allows air to pass to the lower portion of the lubricant reservoir as lubricant is dispensed from the reservoir. The vent valve closes when the lubricant level reaches the vent valve, thereby preventing lubricant from flowing through the (Continued)

vent valve. The sealed vent valve allows the actuator to rise in response to a rising lubricant level.

21 Claims, 7 Drawing Sheets

Related U.S. Application Data filed on Apr. 29, 2015, provisional application No. 62/302,395, filed on Mar. 2, 2016, provisional application No. 62/302,417, filed on Mar. 2, 2016.

(51) Int. Cl.

| | |
|---|---|
| *F16N 7/38* | (2006.01) |
| *F16N 11/08* | (2006.01) |
| *F16N 39/00* | (2006.01) |
| *F04B 53/12* | (2006.01) |
| *F16N 19/00* | (2006.01) |
| *F04B 49/04* | (2006.01) |
| *F04B 53/06* | (2006.01) |
| *F04B 53/16* | (2006.01) |
| *F04B 23/02* | (2006.01) |
| *F16K 31/24* | (2006.01) |
| *F16N 13/02* | (2006.01) |
| *F16K 21/18* | (2006.01) |
| *F16N 37/00* | (2006.01) |
| *F16K 31/22* | (2006.01) |
| *F16K 37/00* | (2006.01) |
| *F16N 21/00* | (2006.01) |
| *F16N 13/00* | (2006.01) |
| *F16N 29/00* | (2006.01) |

(52) U.S. Cl.
CPC ........... *F04B 53/12* (2013.01); *F04B 53/126* (2013.01); *F04B 53/16* (2013.01); *F16K 21/18* (2013.01); *F16K 31/18* (2013.01); *F16K 31/22* (2013.01); *F16K 31/24* (2013.01); *F16K 37/0008* (2013.01); *F16N 7/385* (2013.01); *F16N 11/08* (2013.01); *F16N 13/02* (2013.01); *F16N 19/00* (2013.01); *F16N 19/003* (2013.01); *F16N 19/006* (2013.01); *F16N 21/00* (2013.01); *F16N 37/00* (2013.01); *F16N 39/002* (2013.01); *F16N 7/38* (2013.01); *F16N 13/00* (2013.01); *F16N 29/00* (2013.01); *F16N 2037/006* (2013.01); *F16N 2250/18* (2013.01); *F16N 2260/20* (2013.01); *F16N 2270/14* (2013.01); *F16N 2270/20* (2013.01); *F16N 2280/04* (2013.01)

(56) References Cited

U.S. PATENT DOCUMENTS

| | | | |
|---|---|---|---|
| 1,890,126 A | 12/1932 | Moore | |
| 1,936,778 A | 11/1933 | White | |
| 2,172,647 A | 9/1939 | Widman | |
| 2,792,912 A | 5/1957 | Kangas | |
| 3,261,382 A | 7/1966 | Ensign | |
| 3,586,032 A | 6/1971 | Weinstein | |
| 3,621,670 A | 11/1971 | Kinney | |
| 3,625,244 A | 12/1971 | Giwosky | |
| 3,777,852 A | 12/1973 | Samalon et al. | |
| 4,342,376 A | 8/1982 | Lyden | |
| 4,487,215 A | 12/1984 | Green | |
| 4,535,799 A * | 8/1985 | Boley | F16K 31/18 137/174 |
| 4,884,661 A | 12/1989 | Hoffmann | |
| 4,895,222 A | 1/1990 | Hoffmann | |
| 5,172,714 A * | 12/1992 | Kobayashi | B60K 15/03519 137/202 |
| RE34,391 E | 9/1993 | Blake | |
| 5,313,977 A | 5/1994 | Bergsma et al. | |
| 5,435,335 A * | 7/1995 | Klop | B67D 7/365 137/202 |
| 5,685,331 A | 11/1997 | Westermeyer | |
| 5,957,338 A | 9/1999 | Lehmann | |
| 5,988,201 A | 11/1999 | Lebkuchner et al. | |
| 6,679,286 B2 | 1/2004 | Kato et al. | |
| 7,032,610 B2 | 4/2006 | Matsuo et al. | |
| 7,219,686 B2 | 5/2007 | Schmitz et al. | |
| 7,481,238 B2 | 1/2009 | Ramoth | |
| 7,513,393 B2 * | 4/2009 | Kotyk | B67D 7/16 222/386 |
| 8,448,750 B2 | 5/2013 | Gaugush et al. | |
| 9,458,966 B2 | 10/2016 | Holman et al. | |
| 2009/0078507 A1 * | 3/2009 | Gaugush | G01F 23/74 184/6.4 |
| 2011/0174577 A1 * | 7/2011 | Kreutzkamper | F16N 11/08 184/26 |
| 2013/0092284 A1 * | 4/2013 | Holland | F16N 35/00 141/18 |
| 2013/0256062 A1 * | 10/2013 | Kotyk | F16K 21/18 184/36 |
| 2014/0209175 A1 * | 7/2014 | Cardia | F16K 1/427 137/2 |
| 2015/0034177 A1 | 2/2015 | Kim | |
| 2016/0169448 A1 * | 6/2016 | Holman | F16N 13/06 184/6.4 |
| 2016/0186928 A1 * | 6/2016 | Holman | F16N 29/02 184/6 |
| 2018/0112821 A1 * | 4/2018 | Holman | F04B 53/06 |
| 2018/0142835 A1 * | 5/2018 | Holman | F16N 37/00 |

FOREIGN PATENT DOCUMENTS

| | | |
|---|---|---|
| CN | 103133844 A | 6/2013 |
| CN | 103221732 A | 7/2013 |
| CN | 203147240 U | 8/2013 |
| CN | 203348886 U | 12/2013 |
| CN | 203533164 U | 4/2014 |
| DE | 477094 C | 5/1929 |
| DE | 556682 C | 8/1932 |
| GB | 2258907 A | 2/1993 |
| JP | S5578891 A | 6/1980 |
| JP | H04365624 A | 12/1992 |
| JP | 2952298 B2 | 9/1999 |
| JP | 2977657 B2 | 11/1999 |
| JP | 2003097759 A | 4/2003 |
| JP | 2012-082005 A | 4/2012 |
| JP | 2012082005 A | 4/2012 |
| KR | 20-2000-0010470 U | 6/2000 |
| KR | 100764574 B1 | 10/2007 |
| KR | 10-2012-0122748 A | 11/2012 |
| KR | 1020120122748 A | 11/2012 |
| KR | 101388556 B1 | 4/2014 |
| WO | WO2007027161 A2 | 3/2007 |
| WO | WO2007149685 A2 | 12/2007 |
| WO | WO2013055375 A1 | 4/2013 |
| WO | WO2015021259 A1 | 2/2015 |
| WO | WO2015021260 A1 | 2/2015 |

OTHER PUBLICATIONS

First Examination Report for AU Application No. 2016250782, dated Aug. 16, 2019, pp. 3.
First Examination Report for AU Application No. 2016250786, dated Aug. 23, 2019, pp. 3.
First Examination Report for AU Application No. 2016250783, dated Aug. 22, 2019, pp. 4.
First Examination Report for AU Application No. 2016252858, dated Aug. 19, 2019, pp. 4.
Third Chinese Office Action for CN Application No. 201680023459.0, dated Sep. 23, 2019, pp. 7.
International Preliminary Report on Patentability for PCT Application No. PCT/US2016/028906, dated Oct. 24, 2017, pp. 14.

(56) References Cited

OTHER PUBLICATIONS

Second Chinese Office Action for CN Application No. 201680023510.8, dated May 27, 2019, pp. 17.
International Preliminary Report on Patentability for PCT Application No. PCT/US2016/028903, dated Oct. 24, 2017, pp. 13.
Communication Pursuant to Article 94(3) EPC for EP Application No. 16783961.2, dated Jun. 28, 2019, pp. 4.
International Preliminary Report on Patentability for PCT Application No. PCT/US2016/02889, dated Oct. 24, 2017, pp. 13.
Communication Pursuant to Article 94(3) EPC for EP Application No. 16783960.4, dated Jun. 24, 2019, pp. 6.
Second Chinese Office Action for CN Application No. 201680023449.7, dated Jun. 3, 2019, pp. 18.
International Preliminary Report on Patentability for PCT Application No. PCT/US2016/028891, dated Oct. 24, 2017, pp. 13.
Second Chinese Office Action for CN Application No. 201680023483.4, dated Jun. 17, 2019, pp. 29.
Second Chinese Office Action for CN Application No. 201680023459.0, dated Jun. 18, 2019, pp. 20.
International Search Report and Written Opinion for PCT Application No. PCT/2016/028899 dated Jul. 29, 2016, 14 pages.
International Search Report and Written Opinion for PCT Application No. PCT/2016/028906, dated Aug. 10, 2016, 15 pages.
International Search Report and Written Opinion for PCT Application No. PCT/2016/028903, dated Aug. 3, 2016, 14 pages.
International Search Report and Written Opinion for PCT Application No. PCT/2016/028891, dated Jul. 29, 2016, 14 pages.
Extended European Search Report from EP Application No. 16783962.0, dated Nov. 15, 2018, 8 pages.
Extended European Search Report from EP Application No. 16783961.2, dated Nov. 14, 2018, 8 pag.
Extended European Search Report from EP Application No. 16783960.4, dated Nov. 14, 2018, 7 pages.
Extended European Search Report from EP Application No. 16783955.4, dated Nov. 12, 2018, 9 pages.
First Office Action from Chinese Application No. 201680023510.8, dated Sep. 27, 2018, 19 pages.
First Office Action from Chinese Application No. 201680023483.4, dated Sep. 30, 2018, 21 pages.
First Office Action from Chinese Application No. 201680023449.7, dated Sep. 27, 2018, 20 pages.
First Office Action from Chinese Application No. 201680023459.0, dated Sep. 29, 2018, 21 pages.

* cited by examiner

VENT VALVE

CROSS-REFERENCE TO RELATED APPLICATIONS

This application claims priority to U.S. Provisional Application No. 62/151,593 filed Apr. 23, 2015, and entitled "CENTER FILL OF RESERVOIR FOR PUMP"; to U.S. Provisional Application No. 62/154,222 filed Apr. 29, 2015, and entitled "AUTO FILL SHUTOFF WITH LOW LEVEL"; to U.S. Provisional Application No. 62/302,395 filed Mar. 2, 2016, and entitled "RESERVOIR OVER FILL PROTECTION"; and to U.S. Provisional Application No. 62/302,417 filed Mar. 2, 2016, and entitled "AUTO FILL SHUT OFF BALL CHECK AIR VENT VALVE" the disclosures of which are hereby incorporated in their entirety.

BACKGROUND

The present disclosure relates generally to lubrication systems. More particularly, the disclosure relates to a fill system for a lubricant reservoir.

Machinery often requires lubrication to function. Seals, pistons, bearings, and other parts require lubrication with small, measured amounts of grease or oil over short, frequent time intervals to prevent wear, corrosion, over-lubrication, or under-lubrication. Lubricant fluid is injected at specific locations that require lubrication by lubricant metering devices. A local lubricant reservoir stores the lubricant until the lubricant is to be applied. The lubricant reservoir holds a limited volume of lubricant and must be refilled from a larger lubricant source when the lubricant reservoir is low. Lubricant fluid is drawn from the lubricant reservoir and pumped to the lubricant metering devices via a lubrication line. The lubricant metering devices are configured to inject a set, small amount of lubricant fluid to the specific location within the machinery once the pressure within the lubrication line reaches a predetermined level. After the lubricant metering devices have dispensed the lubricant, the pressure within the lubrication line is relieved, thereby resetting the lubricant system for another lubrication cycle.

SUMMARY

According to one embodiment, a lubricant reservoir includes a housing, an actuator, and a vent valve. The housing defines a reservoir. The actuator is disposed within the housing and divides the reservoir into an upper portion and a lower portion, and the actuator includes a bore extending between a top side of the actuator and a bottom side of the actuator. The vent valve is disposed within the bore and is configured to allow air to pass from the lower portion to the upper portion as lubricant fills the lower portion and to allow air to pass from the upper portion to the lower portion as lubricant is dispensed from the lower portion. The vent valve is further configured to seal the bore in response to a rising level of lubricant in the lower portion to prevent lubricant from passing from the lower portion to the upper portion through the bore. The vent valve includes a first seal disposed within the bore proximate a top side of the plate, a retaining member extending about a lower opening of the bore, and a ball disposed within the bore between the retaining member and the first seal.

According to another embodiment, a lubricant pump includes a pump base, a housing, an actuator, and a vent valve. The pump base includes a wet section and a dry section. The housing is extends from the pump base and defines a lubricant reservoir, the lubricant reservoir provides lubricant to the wet section. The actuator is disposed within the housing and divides the reservoir into a upper portion and lower portion, and the actuator includes a top side, a bottom side, and a bore extending through the actuator between the top side and the bottom side. The vent valve is disposed within the bore and is configured to allow air to pass from the lower portion to the upper portion as lubricant fills the lower portion and to allow air to pass from the upper portion to the lower portion as lubricant is dispensed from the lower portion, and the vent valve is further configured to seal the bore in a leaktight manner in response to a rising level of lubricant in the lower portion such that lubricant cannot pass from the lower portion to the upper portion through the bore.

According to yet another embodiment, an actuator for a lubricant reservoir includes a top side, a bottom side, a bore extending through the actuator between the top side and the bottom side, a seal disposed within the bore proximate the top side, a retaining member extending about the bore proximate the bottom side, and a ball disposed within the bore between the retaining member and the seal. The ball is movable between a first position, where the ball abuts the retaining member, and a second position, where the ball abuts the seal. When the ball is in the first position air passes through the bore from the bottom side to the top side as the lubricant reservoir is filled with lubricant, and air passes through the bore from the top side to the bottom side when lubricant is dispensed from the lubricant reservoir. When the ball is in the second position the ball forms a leaktight connection with the seal such that lubricant cannot flow through the bore.

DETAILED DESCRIPTION

Figure 1:
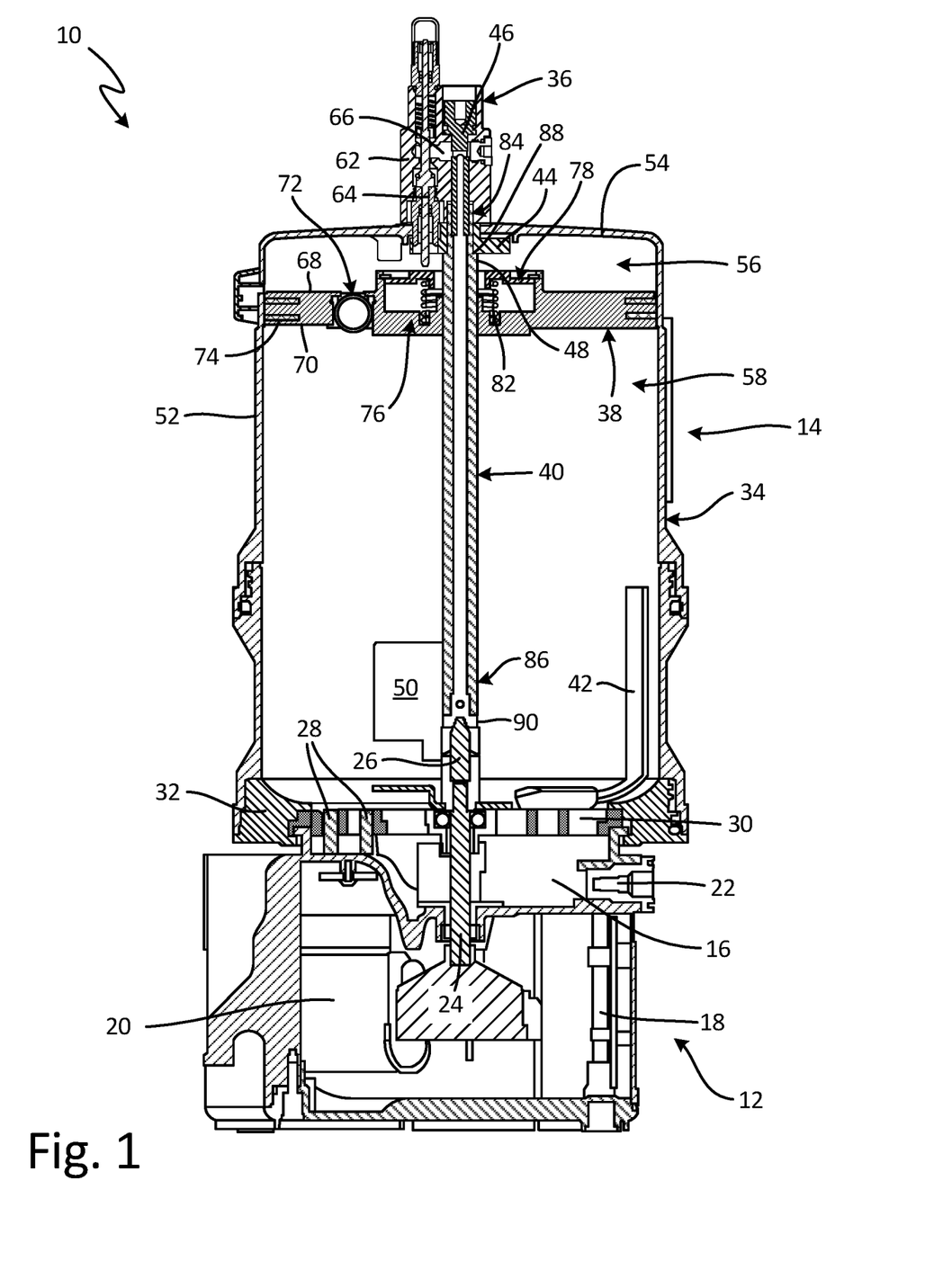
FIG. 1 is a cross-sectional view of a lubricant pump and lubricant reservoir.

FIG. 1 is a cross-sectional view of lubricant system 10. Lubricant system 10 includes lubricant pump 12 and lubricant reservoir 14. Lubricant pump 12 include wet section 16, dry section 18, motor 20, outlet 22, drive shaft 24, locating pin 26, reed switch 28, and ricer plate 30. Lubricant reservoir 14 includes base 32, housing 34, autofill shutoff valve 36, actuator 38, centerfill tube 40, stirring assembly 42, alignment plate 44, connecting bolt 46, and flag 50. Housing 34 includes side wall 52, top surface 54, upper portion 56, and lower portion 58. Side wall 52 includes weep hole 60. Autofill shutoff valve 36 includes valve body 62, valve stem 64, and lubricant flow path 66. Actuator 38 includes top surface 68, bottom surface 70, vent valve 72, seal 74, valve protection chamber 76, and protection mechanism 78. Protection mechanism 78 includes valve actuation plate 80 and elastic member 82. Centerfill tube 40 includes first end 84, second end 86, and shoulder 88. Second end 86 of centerfill tube 40 includes load ports 90.

Wet section 16 and dry section 18 of lubricant pump 12 are separated to prevent lubricant from traveling from wet section 16 to dry section 18. Pump outlet 22 extends into wet section 16 and is configured to receive a lubricant supply tube to provide lubricant downstream from lubricant system 10. Motor 20 is disposed within dry section 18. Drive shaft 24 extends from motor 20, through wet section 16, and into lubricant reservoir 14. Lubricant reservoir 14 is mounted to lubricant pump 12, and lubricant reservoir 14 is configured to provide lubricant to wet section 16. Base 32 is attached to wet section 16 of lubricant pump 12. Ricer plate 30 is disposed at the connection of base 32 and lubricant pump 12, such that lubricant flows through ricer plate 30 when entering wet section 16 from lubricant reservoir 14. Reed switch 28 extends within wet section 16 through ricer plate 30 such that reed switch 28 is positioned flush with ricer plate 30. Locating pin 26 is disposed on and above drive shaft 24 and engages second end 86 of centerfill tube 40. Stirring assembly 42 is connected to drive shaft 24 and is rotatably disposed within lubricant reservoir 14.

Base 32 of lubricant reservoir 14 is mounted to lubricant pump 12 and is configured to allow lubricant to pass downstream from lubricant reservoir 14 to wet section 16 through base 32. Side wall 52 of housing 34 extends from base 32 to define lubricant reservoir 14, and top surface 54 is attached to side wall 52 and encloses lubricant reservoir 14. Actuator 38 is slidably disposed within housing 34 and divides housing 34 into upper portion 56 and lower portion 58. Lower portion 58 is configured to receive and store lubricant. Upper portion 56 is disposed on an opposite side of actuator 38 from lower portion 58 and contains air. Plate spring 48 is disposed between actuator 38 and alignment plate 44, and plate spring 48 is configured to bias actuator 38 away from alignment plate 44. Vent valve 72 extends through actuator 38 between top surface 68 and bottom surface 70. Vent valve 72 is configured to allow air to pass from lower portion 58 to upper portion 56 as lubricant fills or is dispensed from lower portion 58. Valve protection chamber 76 is disposed about and extends from a central portion of actuator 38. Protection mechanism 78 is disposed within valve protection chamber 76. Valve actuation plate 80 and elastic member 82 are disposed within valve protection chamber 76. Elastic member 82 is disposed below valve actuation plate 80 and biases valve actuation plate 80 towards an uppermost portion of valve protection chamber 76.

Autofill shutoff valve 36 is mounted on an exterior side of top surface 54 of housing 34. Lubricant flow path 66 extends through valve body 62 and provides lubricant downstream through connecting bolt 46 and to centerfill tube 40. Valve stem 64 extends through valve body 62, and extends from autofill shutoff valve 36, through alignment plate 44, and into upper portion 56 of housing 34. Alignment plate 44 is disposed on an interior side of top surface 54 opposite autofill shutoff valve 36. First end 84 of centerfill tube 40 extends through alignment plate 44 and top surface 54. Connecting bolt extends through valve body 62 and engages first end 84 of centerfill tube 40 thereby securing autofill shutoff valve 36 housing 34. Centerfill tube 40 extends from connecting bolt 46; through alignment plate 44, protection mechanism 78, and actuator 38; and into lower portion 58 of housing 34. Locating pin 26 extends into second end 86 of centerfill tube 40 and helps maintain the position of centerfill tube 40 within lubricant reservoir 14. Load ports 90 extends into second end 86 of centerfill tube 40 and are configured to provide lubricant to lubricant reservoir 14 from centerfill tube 40. Flag 50 is attached to centerfill tube 40 and disposed within lower portion 58 of housing 34.

Stirring assembly is attached to drive shaft 24 and is rotated by motor 20 when motor 20 is activated. Rotating stirring assembly 42 mixes the lubricant within lubricant reservoir 14, thereby encouraging the flow of lubricant as well as preventing the formation of and eliminating any air pockets. Flag 50 extends from centerfill tube 40 and stirring assembly 42 passes by flag 50 as stirring assembly 42 rotates. Flag 50 is configured to wipe lubricant from stirring assembly 42 as stirring assembly 42 rotates within housing 34 and passes flag 50. In addition, flag 50 encourages mixing of the lubricant. Flag 50 is stationary such that stirring assembly 42 rotating past flag 50 creates turbulence within the lubricant. Reed switch 28 is configured to sense and alert that a level of lubricant within lubricant reservoir 14 is low. A low level alarm may be triggered by reed switch 28 to either indicate to a user that lubricant reservoir 14 should be refilled or activate a supply pump to begin supplying lubricant to lubricant reservoir 14. The low level alarm reduces the frequency that lubricant reservoir 14 is filled, which correspondingly reduces the frequency that the supply tube is attached to autofill shutoff valve 36. Reducing the frequency that the supply tube is attached to autofill shutoff valve 36 reduces the possibility of introducing contaminants to the lubricant from repeatedly attaching and detaching the supply tube.

Lubricant is loaded into lower portion 58 of housing 34 and stored within lower portion 58 until the lubricant is to be applied. When lubricant reservoir 14 runs low, lubricant reservoir 14 is refilled through autofill shutoff valve 36 and centerfill tube 40. Reed switch 28 may provide a low level indication to a user to initiate the refilling of lubricant reservoir 14. The lubricant supply hose is connected to autofill shutoff valve 36 and lubricant is pumped to autofill shutoff valve 36 from a supply reservoir through the lubricant supply hose. The lubricant flows into autofill shutoff valve 36 and through lubricant flow path 66. The lubricant then flows through connecting bolt 46 and enters first end 84 of centerfill tube 40. After entering centerfill tube 40, the lubricant flows through centerfill tube 40 and is fed into lubricant reservoir 14 through load ports 90.

When the lubricant exits centerfill tube 40 through load ports 90, the lubricant is being loaded into lower portion 58 adjacent to the connection between lubricant reservoir 14 and lubricant pump 12. Centerfill tube 40 thus provides lubricant proximate ricer plate 30 and stirring assembly 42. Providing the lubricant to lubricant reservoir 14 proximate ricer plate 30 and wet section 16 fills lubricant reservoir 14 near where the pumps are loaded thereby preventing air pockets from forming within the lubricant. Furthermore, providing the lubricant to lubricant reservoir 14 proximate stirring assembly 42 encourages mixing of the newly provided lubricant, further discouraging the formation of air pockets.

Actuator 38 is disposed near top surface 54 of housing 34 and is configured to slide upward in response to a rising level of lubricant. Actuator 38 is configured to move in response to changes in the lubricant level as the lubricant level rises and falls within lubricant reservoir 14. As such, it is understood that actuator 38 may be any suitable mechanism for shifting upward with the rising lubricant level, such as a follower or diaphragm. Actuator 38 may be prevented from downward travel by a restraining mechanism, such as a ring extending from centerfill tube 40 or a shelf extending into lubricant reservoir 14 from sidewall 92.

As lubricant reservoir 14 is filled, the lubricant level in lower portion 58 begins to rise, and the lubricant displaces any air that was disposed within lower portion 58. The air is vented out of lower portion 58 and to upper portion 56 through vent valve 72 in actuator 38. The air then exits housing 34 from upper portion 56 through weep hole 60 in side wall 52. The lubricant level continues to rise until the lubricant encounters actuator 38. The lubricant causes vent valve 72 to shift to a closed position, wherein vent valve 72 leaktight seal with actuator 38. With vent valve 72 in the closed position, the rising lubricant causes actuator 38 to shift upward.

Actuator 38 shifting upward within housing 34 causes valve actuation plate 80 to engage valve stem 64 and shift valve stem 64 from an open position, wherein the lubricant can flow through autofill shutoff valve 36, to a closed position, wherein the flow of lubricant through autofill shutoff valve 36 is stopped. With the flow of lubricant through autofill shutoff valve 36 is cut off, the pressure within supply line builds. As such, lubricant system 10 may include a pressure switch to automatically shut off the supply pump when lubricant reservoir 14 is full. In this way, autofill shutoff valve 36 and the low level alarm triggered by reed switch 28 ensure that lubricant reservoir 14 is refilled when empty. Limiting refills to when lubricant reservoir 14 is empty limits the number of refills and decreases contaminants within the lubricant supply. In addition, autofill shutoff valve 36 ceases the flow of lubricant to housing 34 when lubricant reservoir 14 is full preventing lubricant reservoir 14 from being overfilled, thereby preventing lubricant reservoir 14 from experiencing damage due to overfilling.

Loading lubricant reservoir 14 through autofill shutoff valve 36 and centerfill tube 40 eliminates the need for additional external plumbing. Centerfill tube 40 loads the lubricant into lower portion 58 of lubricant reservoir 14 proximate stirring assembly 42 and ricer plate 30. Loading the lubricant near stirring assembly 42 encourages mixing of the lubricant which helps eliminate air pockets. In addition, loading lubricant reservoir 14 near ricer plate 30, which is disposed at the boundary of lower portion 58 and wet section 16, allows the lubricant to be loaded directly to wet section 16, without requiring the weight of the lubricant to force the lubricant to the pump, which also eliminates air pockets and other undesirable features from forming in the lubricant.

Figure 2:
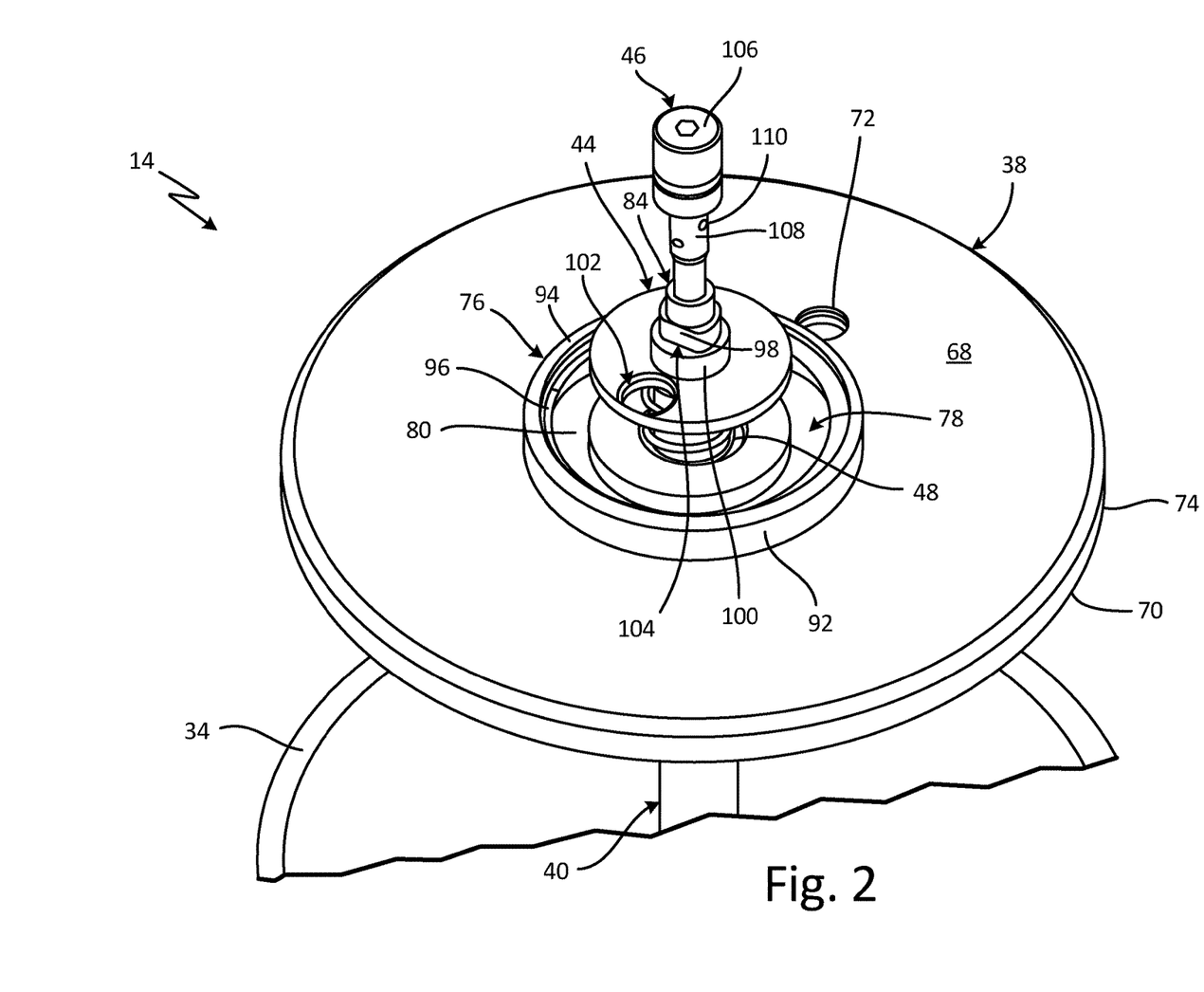
FIG. 2 is a partially exploded view of a portion of a lubricant reservoir.

FIG. 2 is a partially exploded view of lubricant reservoir 14. Lubricant reservoir 14 includes housing 34, actuator 38, centerfill tube 40, alignment plate 44, connecting bolt 46, and plate spring 48. Actuator 38 includes top surface 68, bottom surface 70, vent valve 72, seal 74, valve protection chamber 76, and protection mechanism 78. Valve protection chamber 76 includes sidewall 92, groove 94, and retaining clip 96. Protection mechanism 78 includes valve actuation plate 80. Centerfill tube 40 includes first end 84 and anti-rotation surface 98. Alignment plate 44 includes collar 100, aperture 102, and anti-rotation feature 104. Connecting bolt 46 includes head 106 and shank 108. Shank 108 includes lubricant ports 110.

Actuator 38 is disposed within housing 34. Seal 74 extends from an outer circumferential edge of actuator 38 to form a leaktight seal within housing 34. Sidewall 92 extends from top surface 68 and defines valve protection chamber 76. Groove 94 extends about an interior surface of sidewall 92. Retaining clip 96 is disposed in valve protection chamber 76 within groove 94, and is disposed near a top portion of valve protection chamber 76. Valve actuation plate 80 is disposed within valve protection chamber 76 below retaining clip 96, such that retaining clip 96 secures valve actuation plate 80 within valve protection chamber 76. Vent valve 72 extends through actuator 38 and allows air to pass from below actuator 38 to above actuator 38 as well as from above actuator 38 to below actuator 38. Vent valve 72 also creates a seal to prevent lubricant from flowing from below actuator 38 to above actuator 38.

Alignment plate 44 is configured to be disposed on an interior side of top surface 54 (best seen in FIG. 1) of housing 34. Plate spring 48 is disposed between alignment plate 44 and actuator 38, and plate spring 48 is configured to bias actuator 38 away from alignment plate 44. Collar 100 of alignment plate 44 extends through an opening in top surface 54. Centerfill tube 40 extends through alignment plate 44, protection mechanism 78, and actuator 38 as centerfill tube 40 extends through housing 34. First end 84 of centerfill tube 40 extends through collar 100 of alignment plate 44 and is attached to shank 108 of connecting bolt 46. Anti-rotation surface 98 is disposed on an exterior side of centerfill tube 40. Anti-rotation surface 98 mates with anti-rotation feature 104 on alignment plate 44 such that alignment plate 44 prevents centerfill tube 40 from rotating within housing 34. Aperture 102 extends through alignment plate 44. Aperture 102 is configured such that valve stem 64 (shown in FIG. 1) may pass through aperture 102 to engage valve actuation plate 80.

Head 106 of connecting bolt 46 is attached to shank 108. Shank 108 is attached to first end 84 of centerfill tube 40. Shank 108 may include external threading configured to mate with internal threading within first end 84 of centerfill tube 40. Load ports 90 extend into shank 108. Shank 108 is preferably hollow such that lubricant is provided to centerfill tube 40 through shank 108. The lubricant enters shank 108 from lubricant flow path 66 (shown in FIG. 1) through load ports 90.

Lubricant is loaded into lubricant reservoir 14 during filling, and actuator 38 is configured to move upward within housing 34 as a lubricant level within housing 34 rises. The lubricant flows through a fill valve and to connecting bolt 46. The lubricant enters shank 108 of connecting bolt 46 through load ports 90 and flows to first end 84 of centerfill tube 40. The lubricant then flows through centerfill tube 40 and is loaded into lubricant reservoir 14 through an end of centerfill tube 40 disposed opposite first end 84. Connecting bolt 46 thus connects the fill valve to both lubricant reservoir 14 and to centerfill tube 40.

As the lubricant is loaded into lubricant reservoir 14, a stirring assembly, such as stirring assembly 42 (shown in FIG. 1), rotates within the lower portion of lubricant reservoir 14. The rotation of the stirring assembly exerts a rotational force on centerfill tube 40. However, as centerfill tube 40 extends through alignment plate 44 anti-rotation surface 98 engages anti-rotation feature 104 to prevent centerfill tube 40 from rotating. In addition, valve stem 64 extends through aperture 102 to prevent alignment plate 44 from rotating relative to housing 34. As such, valve stem 64 extends through aperture 102 to prevent alignment plate 44 from rotating, and anti-rotation surface 98 engages anti-rotation feature 104 to prevent centerfill tube 40 from rotating.

The lubricant flows into lubricant reservoir 14 and the lubricant level rises until the lubricant interfaces with bottom surface 70 of actuator 38. When the lubricant reaches bottom surface 70, vent valve 72 is shifted to a closed position by the lubricant thereby creating a seal through actuator 38 and preventing any lubricant from flowing from below actuator 38 to above actuator 38. Vent valve 72 closing creates a leaktight seal and the rising level of lubricant forces actuator 38 up within lubricant reservoir 14. Actuator 38 continues to rise until valve protection plate 80 encounters valve stem 64 and forces the valve stem from an open position to a closed position. With valve stem 64 in the closed position the flow of lubricant is blocked, thereby stopping the fill process when lubricant reservoir 14 is full.

Figure 3A:
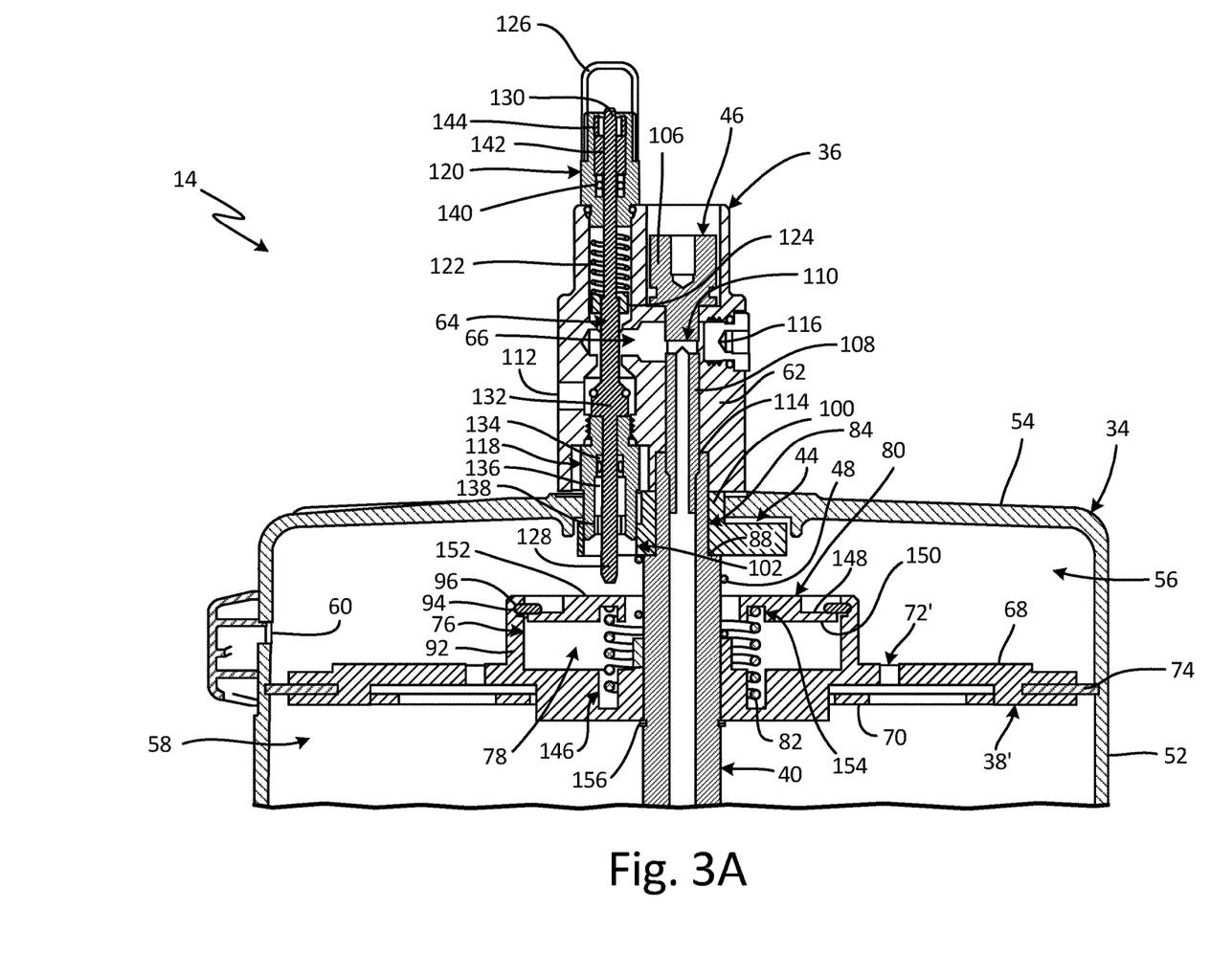
FIG. 3A is a cross-sectional view of a fill mechanism of a lubricant reservoir in a refill state.
Figure 3B:
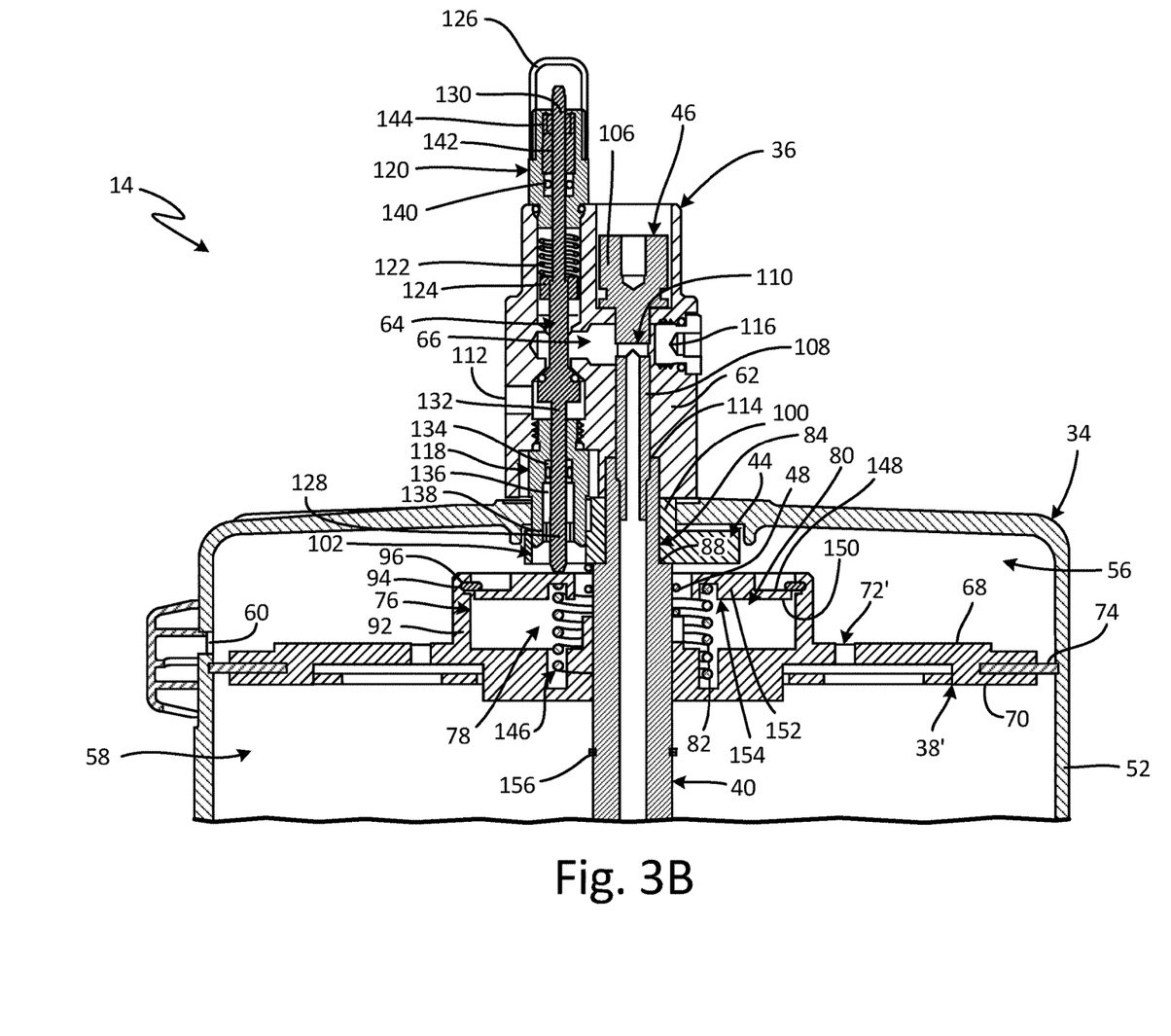
FIG. 3B is a cross-sectional view of a fill mechanism of a lubricant reservoir in a filled state.
Figure 3C:
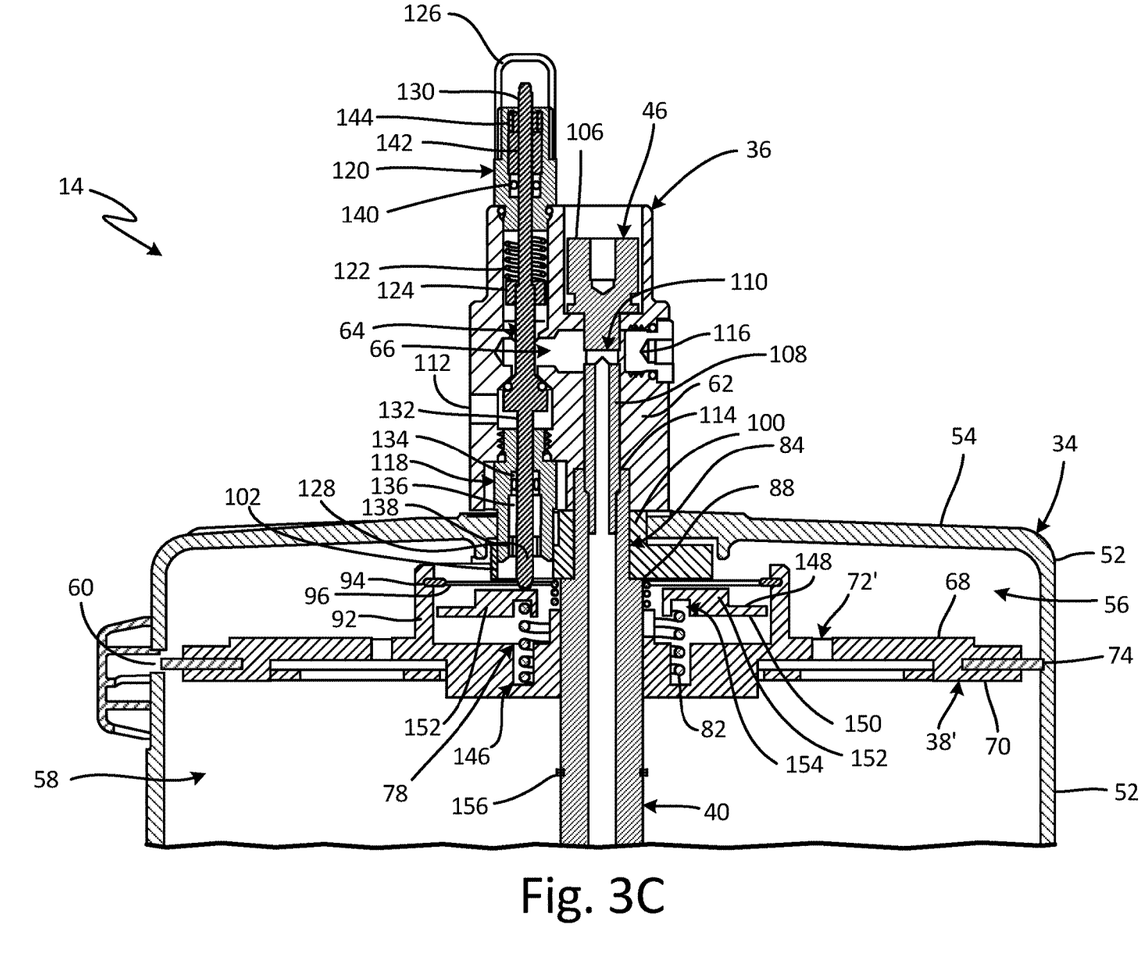
FIG. 3C is a cross-sectional view of a fill mechanism of a lubricant reservoir in an overfill state.

FIG. 3A is a cross-sectional view of lubricant reservoir 14 in a refill state. FIG. 3B is a cross-sectional view of lubricant reservoir 14 in a filled state. FIG. 3C is a cross-sectional view of lubricant reservoir 14 in an overfill state. Lubricant reservoir 14 includes housing 34, autofill shutoff valve 36, actuator 38', centerfill tube 40, alignment plate 44, connecting bolt 46, and plate spring 48. Actuator 38' is substantially similar to actuator 38 and similar reference numbers will be used to identify similar components. Housing 34 includes side wall 52, top surface 54, upper portion 56, and lower portion 58. Side wall 52 includes weep hole 60. Autofill shutoff valve 36 includes valve body 62, valve stem 64, lubricant flow path 66, lubricant inlet 112, first outlet 114, second outlet 116, first retaining member 118, second retaining member 120, bias spring 122, shoulder 124, and bulb 126. Valve stem 64 includes first end 128, second end 130, and sealing portion 132. First retaining member 118 includes first throat seal 134, first alignment sleeve 136, and first retaining clip 138. Second retaining member 120 includes second throat seal 140, second alignment sleeve 142, and second retaining clip 144. Actuator 38' includes top surface 68, bottom surface 70, vent valve 72', seal 74, valve protection chamber 76, and protection mechanism 78. Valve protection chamber 76 includes sidewall 92, groove 94, retaining clip 96, and first annular recess 146. Protection mechanism 78 includes valve actuation plate 80 and elastic member 82. Valve actuation plate 80 includes top surface 148, bottom surface 150, plateau 152, and second annular recess 154. Centerfill tube 40 includes first end 84, shoulder 88, and plate retaining clip 156. Alignment plate 44 includes collar 100 and aperture 102. Connecting bolt 46 includes head 106 and shank 108. Shank 108 includes lubricant ports 110.

Actuator 38' is disposed within housing 34 and divides housing 34 into upper portion 56 and lower portion 58. Weep hole 60 extends through side wall 52 to connect lubricant reservoir 14 to the atmosphere. Seal 74 extends from an outer edge of actuator 38 and engages side wall 52. Vent valve 72' extends through actuator 38' between top surface 68 and bottom surface 70. Vent valve 72' is similar to vent valve 72 in that air may pass through vent valve 72' while lubricant is prevented from passing through vent valve 72', but vent valve 72' does not include components configured to create a leaktight seal between lower portion 58 and upper portion 56. Vent valve 72' is instead sized so air is able to pass through vent valve 72' but lubricant is prevented from passing through vent valve 72'. Sidewall 92 of valve protection chamber 76 extends from top surface 68 of actuator 38' to define valve protection chamber 76. Groove 94 extends about sidewall 92, and retaining clip 96 is disposed within groove 94. Plate spring 48 extends between actuator 38' and alignment plate 44, and plate spring 48 extends through valve actuation plate 80.

Valve actuation plate 80 and elastic member 82 are disposed within valve protection chamber 76. Plateau 152 extends from top surface 148 of valve actuation plate 80. First annular recess 146 extends into actuator 38' and extends about centerfill tube 40. Second annular recess 154 extends through bottom surface 150 of valve actuation plate 80 and into plateau 152. Elastic member 82 is disposed below valve actuation plate 80, and a first end of elastic member is disposed in first annular recess 146 and a second end of elastic member is disposed in second annular recess 154. Elastic member 82 biases valve actuation plate 80 away from actuator 38'. Retaining clip 96 abuts top surface 148 of valve actuation plate 80 and secures valve actuation plate 80 within valve protection chamber 76. Plate retaining clip 156 extends about centerfill tube 40 and abuts a bottom surface 70 of actuator 38'. Plate retaining clip 156 is configured to limit the downward travel of actuator 38' within housing.

Autofill shutoff valve 36 is disposed on top surface 54 of housing 34. Lubricant flow path 66 extends through valve body 62. Lubricant inlet 112 extends into valve body 62 and connects with lubricant flow path 66. Lubricant inlet is configured to receive a supply tube and to provide lubricant from the supply tube to lubricant flow path 66. Centerfill tube 40 extends through actuator 38' and protection mechanism 78. First end 84 of centerfill tube 40 extends through alignment plate 44 and engages shank 108 of connecting bolt 46. Connecting bolt 46 extends through autofill shutoff valve 36, and head 106 is disposed outside of valve body 62 while shank 108 extends through valve body 62 to engage centerfill tube 40 and secure autofill shutoff valve 36 to housing 34. Shank 108 may include external threading and first end 84 of centerfill tube 40 may include internal threading configured to mate with the external threading on shank 108. Lubricant ports 110 are disposed within lubricant flow path 66 and configured to receive lubricant from lubricant flow path 66. First outlet 114 extends into valve body 62 proximate the connection of shank 108 and connecting bolt 46, and first outlet 114 provides lubricant directly to lubricant reservoir 14 through a top portion of housing 34. Second outlet 116 extends into valve body 62 and may receive external plumbing to allow lubricant to flow to lubricant reservoir through autofill shutoff valve 36 and the external plumbing.

Valve stem 64 is disposed within valve body 62 and extends through autofill shutoff valve 36. First end 128 extends through first retaining member 118 and into upper portion 56 of lubricant reservoir 14. Sealing portion 132 extends from valve stem 64 and is disposed proximate lubricant inlet 112. Second end 130 extends through second retaining member 120. Shoulder 124 extends about and is secured to valve stem 64, and bias spring 122 surrounds valve stem 64 and is disposed between shoulder 124 and second retaining member 120. Bulb 126 is secured to second retaining member 120 and disposed outside of autofill shutoff valve 36.

In FIG. 3A, lubricant reservoir 14 is in a refill state wherein a lubricant level within lubricant reservoir 14 is low. Lubricant is flowed to autofill shutoff valve 36 from a supply reservoir. The lubricant flows through autofill shutoff valve 36, to centerfill tube 40, and into lubricant reservoir 14. A lubricant supply hose from the supply reservoir is connected to lubricant inlet 112. The lubricant flows through lubricant inlet 112 proceeds through lubricant flow path 66 and to connecting bolt 46. The lubricant then flows into shank 108 through lubricant ports 110. Where lubricant reservoir 14 is centrally filled, the lubricant proceeds through shank 108 and to centerfill tube 40. Centerfill tube 40 loads the lubricant into lower portion 58 of lubricant reservoir 14 proximate stirring assembly 42 (shown in FIG. 1) and ricer plate 30 (shown in FIG. 1). Alternatively, the lubricant may flow through lubricant ports 110 and proceed to second outlet 116. Where external plumbing is connected to second outlet 116, the lubricant may flow to the external plumbing and be provided to lubricant reservoir 14 through the external plumbing. External plumbing may supply the lubricant to lubricant reservoir 14 at any suitable location, such as through an inlet port disposed at a bottom of lubricant reservoir 14.

As the lubricant level rises in lower portion 58 of housing 34, air is displaced from lower portion 58 and to upper portion 56. Vent valve 72' allows air to vent from lower portion 58 to upper portion 56 as the lubricant fills lower portion 58. The venting air may proceed to the atmosphere through weep hole 60 in sidewall 92.

In the refill state actuator 38' rests on plate retaining clip 156, as plate retaining clip 156 defines the limit of downward travel for actuator 38'. While actuator 38' is described as having a limited downward travel, it is understood that lubricant reservoir 14 may include a follower plate that follows the lubricant level fully or partially down lubricant reservoir 14 or may include a static seal, such as a diaphragm. The lubricant level within lower portion 58 continues to rise and the lubricant eventually reaches actuator 38'. Vent valve 72' prevents the lubricant from flowing from lower portion 58 to upper portion 56 through actuator 38'. As such, actuator 38' begins to rise with the rising lubricant level.

In FIG. 3B lubricant reservoir 14 is shown in a filled state where lubricant reservoir 14 is full. The rising lubricant level in lubricant reservoir 14 causes actuator 38' to rise until valve actuation plate 80 encounters first end 128 of valve stem 64. Elastic member 82 biases valve actuation plate 80 against retaining clip 96 as actuator 38' rises. Elastic member 82 is sufficiently resilient to maintain valve actuation plate 80 against retaining clip 96 even as valve stem 64 is pushed from a first position (shown in FIG. 2A) to a second position (shown in FIG. 2B). In the first position, valve stem 64 allows lubricant to flow through autofill shutoff valve 36 and to lower portion 58 through centerfill tube 40. In the second position valve stem 64 cuts off the flow of lubricant through autofill shutoff valve 36.

Lubricant continues to be fed into housing 34 through autofill shutoff valve 36 and centerfill tube 40 as actuator 38' rises. The rising actuator 38' causes plateau 152 of valve actuation plate 80 to encounter valve stem 64 and shift valve stem 64 from the first position to the second position. As valve stem 64 shifts to the second position, first end 128 of valve stem 64 slides through first retaining member 118. First retaining member 118 and second retaining member 120 balance valve stem 64 to minimize the force necessary to actuate autofill shutoff valve 36 to the second position, thereby reducing wear on the system and providing a more responsive and timely control of the flow of lubricant.

Plateau 152 abuts first end 128 of valve stem 64 and forces valve stem 64 up until sealing portion 132 is forced into a connection disposed between lubricant inlet 112 and lubricant flow path 66. Pushing sealing portion 132 into the connection blocks the flow of lubricant through autofill shutoff valve 36. As such, sealing portion 132 prevents additional lubricant from flowing to lubricant reservoir 14. With the connection between lubricant inlet 112 and lubricant flow path 66 sealed, the pump that was providing lubricant to lubricant reservoir 14 may deadhead. A pressure sensor may sense the increased pressure in the supply tube to automatically cease fill operations. Alternatively, a switch may be activated by autofill shutoff valve 36 to automatically shut off the supply pump.

As valve actuation plate 80 pushes valve stem 64 upward, second end 130 of valve stem 64 extends through second retaining member 120 and projects into bulb 126. Bulb 126 is preferably made of a translucent material, such that second end 130 is visible through bulb 126. As such, second end 130 projecting into bulb 126 provides a visual indication to a user that lubricant reservoir 14 is full, and thus that the flow of lubricant through autofill shutoff valve 36 has been stopped. While autofill shutoff valve 36 is described as including bulb 126 for providing a visual indication, it is understood that autofill shutoff valve 36 may include a mechanism activated by second end 130 to indicate that lubricant reservoir 14 is full, such as a cycle switch.

When valve stem 64 rises to the second position, bias spring 122 is compressed between shoulder 124 and second retaining member 120. Bias spring 122 remains compressed until the lubricant level in lower portion 58 drops as lubricant is dispensed from lubricant reservoir 14. Once the lubricant level drops sufficiently, actuator 38' travels downward and causes valve actuation plate 80 to disengage from valve stem 64. As such, valve stem 64 may return to the position shown in FIG. 3A, and bias spring 122 assists valve stem 64 in returning to the position shown in FIG. 3A.

Autofill shutoff valve 36 automatically blocking the flow of lubricant when lubricant reservoir 14 is full helps prevent overfilling of lubricant reservoir 14 and helps prevent damage to various components that may occur due to overfilling. In addition, autofill shutoff valve 36 reduces potential wasting of lubricant due to the lubricant overflowing through weep hole 60 if reservoir is overfilled.

In FIG. 3C lubricant reservoir 14 is shown in an overfill state. An overfill state occurs when the lubricant level has risen beyond that required to cause autofill shutoff valve 36 to shift to the second position. The lubricant level may rise due to thermal expansion of the lubricant, due to a user manually filling the reservoir, due to other causes. When lubricant reservoir 14 experiences an overfill state, protection mechanism 78 prevents the rising actuator 38' from damaging autofill shutoff valve 36.

To cut off the flow of lubricant to lubricant reservoir 14 through autofill shutoff valve 36, valve stem 64 is actuated from the first position (shown in FIG. 2A) to the second position (shown in FIGS. 2B and 2C). In the second position valve stem 64 is incapable of being displaced vertically upward due to sealing portion 132 engaging valve body 62 to seal the connection between lubricant inlet 112 and lubricant flow path 66. As such, valve stem 64 cannot travel upward as actuator 38' travels upward due to the rising lubricant level within lubricant reservoir 14. The rising actuator 38' could thus damage autofill shutoff valve 36.

Protection mechanism 78 is configured to protect lubrication system 10 from overpressurization that would damage lubricant reservoir 14. Protection mechanism 78 also prevents autofill shutoff valve 36 from being damaged by the rising actuator 38'. Overfill protection mechanism is configured such that valve actuation plate 80 remains static relative to sidewall 92 of housing 34 as actuator 38' rises in response to an overfill event. Valve stem 64 abuts plateau 152 of overfill plate. As actuator 38' rises in response to the rising level of lubricant, valve stem 64 exerts sufficient force on valve actuation plate 80 to cause elastic member 82 to compress within valve protection chamber 76. The compression of elastic member 82 allows valve actuation plate 80 to remain static relative to valve stem 64 and sidewall 92, thereby preventing excessive force from being transmitted to valve stem 64 and autofill shutoff valve 36. The lubricant within lower portion 58 may continue to expand until seal 74 passes weep hole 60. When seal 74 passes weep hole 60, the expanding and excess lubricant may vent through weep hole 60.

Protection mechanism 78 prevents lower portion 58 from being overpressurized due to excess lubricant being present in lower portion 58. As such, overfill protection mechanism prevents damage from occurring to housing 34, actuator 38', autofill shutoff valve 36, and other components of lubricant system 10. In addition, protection mechanism 78 reduces lubricant waste because the lubricant in lower portion 58 is able to expand before the lubricant is vented through weep hole 60, thereby preventing lubricant from being vented too quickly.

Figure 4A:
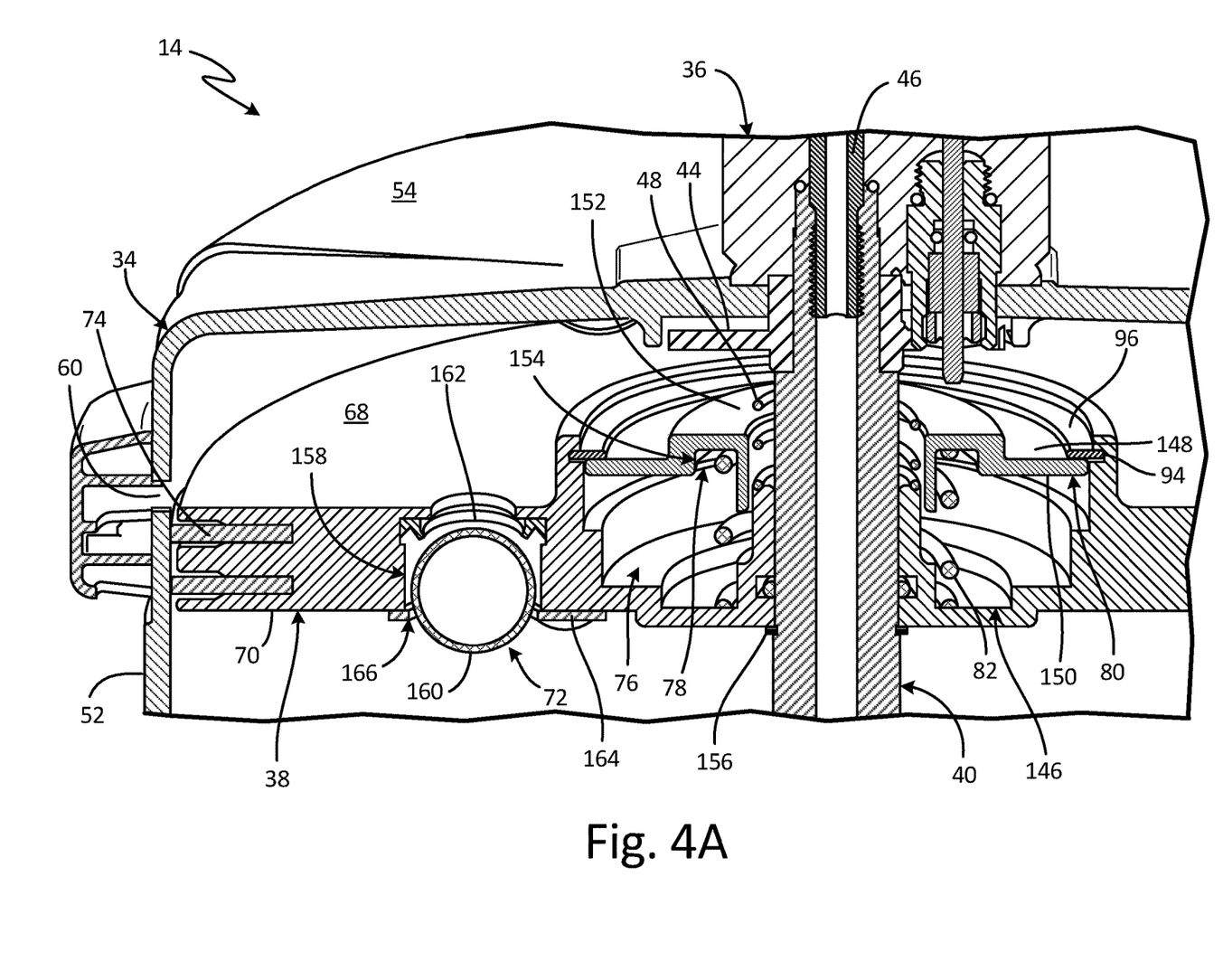
FIG. 4A is a cross-sectional view of an actuator and vent valve for a lubricant reservoir in a venting state.
Figure 4B:
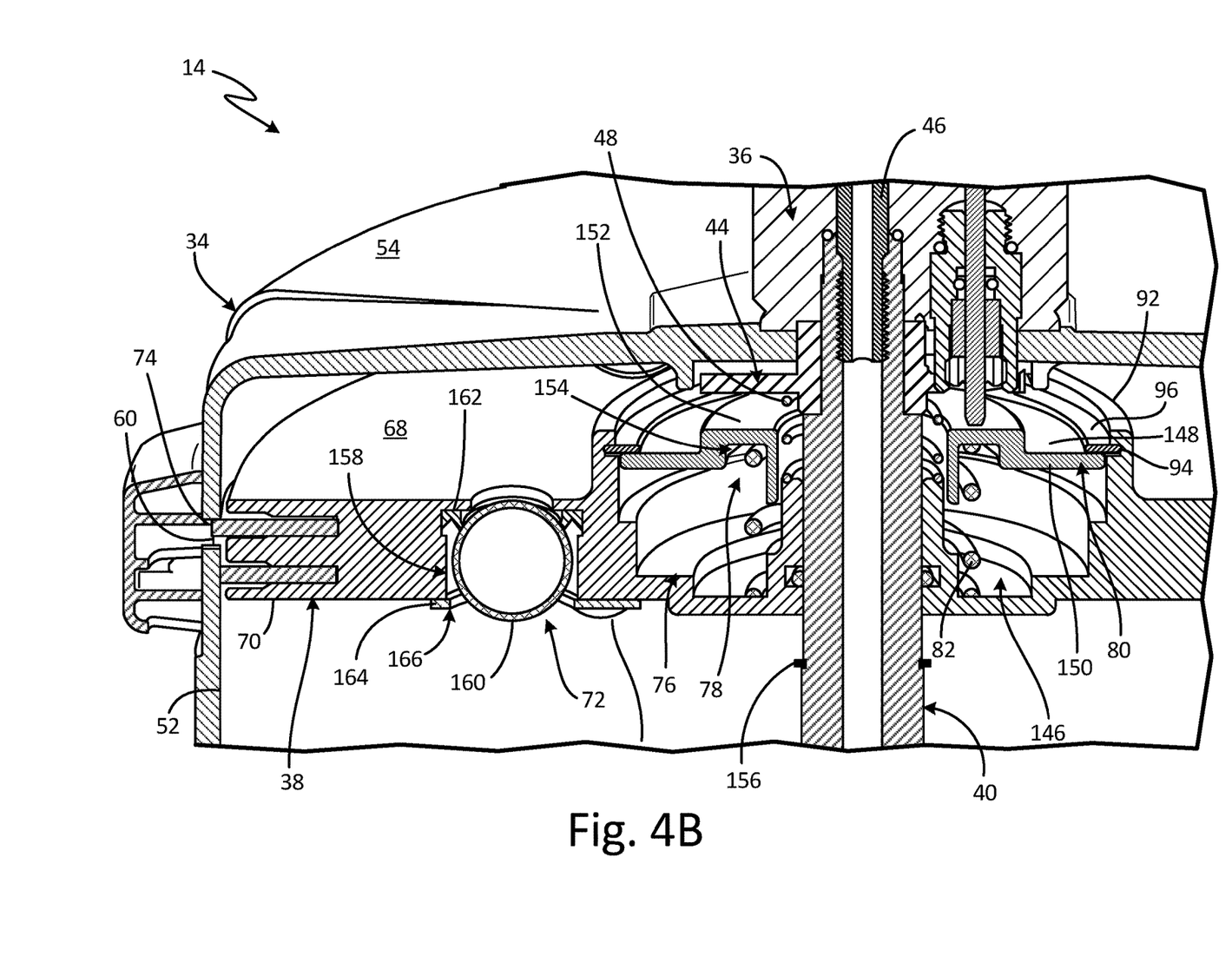
FIG. 4B is a cross-sectional view of an actuator and vent valve for a lubricant reservoir in a sealing state.

FIG. 4A is a cross-sectional view of actuator 38 for lubricant reservoir 14 in a venting state. FIG. 4B is a cross-sectional view of actuator 38 for lubricant reservoir 14 in a sealing state. Lubricant reservoir 14 includes housing 34, autofill shutoff valve 36, actuator 38, centerfill tube 40, alignment plate 44, connecting bolt 46, and plate spring 48. Housing 34 includes side wall 52 and top surface 54, and side wall 52 includes weep hole 60. Actuator 38 includes top surface 68, bottom surface 70, vent valve 72, seal 74, valve protection chamber 76, protection mechanism 78, and bore 158. Valve protection chamber 76 includes sidewall 92, groove 94, retaining clip 96, and first annular recess 146. Protection mechanism 78 includes valve actuation plate 80 and elastic member 82. Valve actuation plate 80 includes top surface 148, bottom surface 150, plateau 152, and second annular recess 154. Vent valve 72 includes ball 160, valve seal 162, and retaining member 164. Retaining member 164 includes air passage 166. Centerfill tube 40 includes plate retaining clip 156.

Actuator 38 is disposed within housing 34 divides housing 34 into upper portion 56 and lower portion 58. Weep hole 60 extends through side wall 52 to connect lubricant reservoir 14 to the atmosphere. Seal 74 extends from an outer edge of actuator 38 and engages side wall 52. Sidewall 92 of valve protection chamber 76 extends from top surface of actuator 38 to define valve protection chamber 76. Protection mechanism 78 is disposed within valve protection chamber 76. Retaining clip 96 is disposed within groove 94 of sidewall 92. Valve actuation plate 80 and elastic member 82 are disposed within valve protection chamber 76 below retaining clip 96, with elastic member 82 disposed below valve actuation plate 80. A first end of elastic member 82 is disposed in first annular recess 146 and a second end of elastic member 82 is disposed in second annular recess 154.

Bore 158 extends through actuator 38 between top surface 68 and bottom surface 70. Vent valve 72 is disposed within bore 158. Valve seal 162 is disposed within bore 158 proximate top surface 68 of actuator 38, and retaining member 164 is disposed about bore 158 proximate bottom surface 70 of actuator 38. Ball 160 is disposed within bore 158 between valve seal 162 and retaining member 164. Air passage 166 extend through retaining member 164. A diameter of a lower opening of bore 158 is greater than a diameter of a top opening of bore 158.

Autofill shutoff valve 36 is disposed on an exterior side of top surface 54 of housing 34. Connecting bolt 46 extends through autofill shutoff valve 36 and engages centerfill tube 40. Centerfill tube 40 extends through alignment plate 44, actuator 38, and protection mechanism 78. Connecting bolt 46 secures autofill shutoff valve 36 to housing through the connection of connecting bolt 46 and centerfill tube 40. Plate retaining clip 156 extends about centerfill tube 40 and defines a lower limit of travel for actuator 38.

Autofill shutoff valve 36, connecting bolt 46, and centerfill tube 40 form a flow path for lubricant to enter lower portion 58 of housing 34. Lubricant enters autofill shutoff valve 36 through a lubricant inlet and flows to connecting bolt 46. The lubricant flows through connecting bolt 46 and to centerfill tube 40, and the lubricant flows through centerfill tube 40 and is loaded into lower portion 58 of housing 34. The lubricant is loaded into lower portion 58 of housing 34 and the lubricant level rises until the lubricant encounters actuator 38. Once the lubricant encounters actuator 38, the rising lubricant level shifts actuator 38 upwards until autofill shutoff valve 36 is actuated from a first position (shown in FIG. 3A) to a second position (shown in FIG. 3B), thereby blocking the flow of lubricant to lower portion 58.

In FIG. 4A, actuator 38 is shown in a venting state, where vent valve 72 is open. Lubricant is disposed within lower portion 58 of housing 34. As lubricant is fed to lower portion 58 the lubricant level rises within housing 34. The rising lubricant level displaces air from lower portion 58 of housing. The air is vented from lower portion 58 to upper portion 56 through vent valve 72. The air vents to the atmosphere from upper portion 56 through weep hole 60. Ball 160 rests on retaining member 164 as lubricant fills lower portion. Air passage 166 through retaining member 164 allows air to pass through vent valve 72 even with ball 160 resting on retaining member 164. Lubricant continues to fill lower portion 58 until the lubricant level reaches ball 160.

In FIG. 4B, actuator 38 is shown in a sealing state where vent valve 72 is closed. The lubricant level rises within lower portion 58 until the lubricant contacts ball 160. Ball 160 is configured to shift with the rising level of lubricant, such as by floating on the lubricant. Ball 160 shifts from the venting position, shown in FIG. 4A, to the sealing position, shown in FIG. 4B. In the sealing position ball 160 contacts valve seal 162 and forms a leaktight seal through bore 158. As such, vent valve 72 prevents lubricant from passing through bore 158 between lower portion 58 and upper portion 56.

With vent valve 72 in the sealing position lubricant is prevented from flowing from lower portion 58 to upper portion 56. The lubricant can neither flow around actuator 38 due to seal 74 nor flow through actuator 38 due to vent valve 72. As such, the rising lubricant level shifts actuator 38 upwards within housing 34. Actuator 38 continues to rise with the lubricant level until the flow of lubricant is cut off.

After the flow of lubricant to lower portion 58 is cut off, the lubricant maintains vent valve 72 in the sealing position until the lubricant level drops. As the lubricant level in lower portion 58 drops, actuator 38 shifts downwards with the dropping lubricant level. Actuator 38 continues to shift downward until actuator 38 encounters plate retaining clip 156. Plate retaining clip 156 maintains a position of actuator 38 on centerfill tube 40 as the lubricant level continues to fall.

With actuator 38 supported on plate retaining clip 156 vent valve 72 shifts from the sealing position, shown in FIG. 4B, back to the venting position, shown in FIG. 4A. Ball 160 shifts within bore 158 to again rest on retaining member 164. Air enters lower portion 58 as the lubricant is dispensed to fill the volume of lower portion 58 vacated by the dispensed lubricant. The air flows into upper portion 56 through weep hole 60. From upper portion 56, the air flows through bore 158, around ball 160, and through air passage 166 in retaining member 164 to enter lower portion.

As such, in the venting position vent valve 72 allows air to pass from lower portion 58 and to upper portion 56 as lubricant fills lower portion 58. Vent valve 72 also allows air to pass from upper portion 56 and to lower portion 58 as lubricant is dispensed from lower portion 58. In the sealing position vent valve 72 prevents lubricant from flowing from lower portion 58 to upper portion 56, and vent valve 72 creates a leaktight seal through bore 158 thereby enabling actuator 38 to rise with a rising lubricant level.

Although the present invention has been described with reference to preferred embodiments, workers skilled in the art will recognize that changes may be made in form and detail without departing from the spirit and scope of the invention.

The invention claimed is:

1. A lubricant reservoir comprising:
a housing defining a reservoir;
an actuator disposed within the housing and dividing the reservoir into an upper portion and a lower portion, wherein the actuator includes a bore extending between a top side of the actuator and a bottom side of the actuator, and wherein the actuator is movable within the housing in response to a changing lubricant level and to alter a first volume of the upper portion and a second volume of the lower portion; and
a vent valve disposed within the bore and movable with the actuator, wherein the vent valve is normally open to allow air to pass between the lower portion and the upper portion and is actuated to a closed state by a rising level of lubricant in the lower portion, and wherein the vent valve comprises:
a first seal disposed within the bore proximate a top side of the actuator;
a retaining member extending about a lower opening of the bore; and
a ball disposed within the bore at least partially between the retaining member and the first seal;
wherein the vent valve being in the closed state prevents the lubricant from flowing from the lower portion to the upper portion to allow the lubricant to exert a biasing force on the actuator to displace the actuator upward within the housing.

2. The lubricant reservoir of claim 1, wherein the retaining member includes an air passage extending through the retaining member.

3. The lubricant reservoir of claim 1, wherein the ball is configured to move in reaction to a lubricant level such that the lubricant forces the ball onto the seal.

4. The lubricant reservoir of claim 1, wherein the bore includes an annular groove proximate the top side of the actuator, wherein the first seal is disposed within the annular groove.

5. The lubricant reservoir of claim 1, wherein the first seal is a one-way seal.

6. The lubricant reservoir of claim 1, and further comprising:
a second seal extending from an outer circumferential edge of the actuator and abutting the side wall of the housing, wherein the second seal is configured to prevent lubricant from flowing from the lower portion to the upper portion around an outer circumferential edge of the actuator.

7. The lubricant reservoir of claim 1, wherein the bore includes an upper opening having a first diameter and a lower opening having a second diameter, wherein the first diameter is smaller than the second diameter.

8. A lubricant pump comprising:
a pump base comprising a wet section and a dry section;
a housing extending from the pump base and defining a lubricant reservoir, wherein the lubricant reservoir provides lubricant to the wet section;
an actuator disposed within the housing and dividing the reservoir into an upper portion and a lower portion, wherein the actuator is movable within the housing to alter a first volume of the upper portion and a second volume of the lower portion, wherein the actuator includes a top side, a bottom side, and a bore extending through the actuator between the top side and the bottom side; and
a vent valve disposed within the bore and moveable with the actuator;
wherein the vent valve is normally open to allow air to pass between the lower portion and the upper portion and is actuated to a closed state by a rising level of lubricant in the lower portion to seal the bore such that lubricant cannot pass from the lower portion to the upper portion through the bore; and
wherein the vent valve being in the closed state prevents the lubricant from flowing from the lower portion to the upper portion and causes the lubricant to exert a biasing force on the actuator to displace the actuator within the housing.

9. The lubricant pump of claim 8, wherein the vent valve comprises:
a seal disposed within the bore proximate a top side of the actuator;
a retaining member extending about a lower opening of the bore; and
a ball disposed within the bore between the retaining member and the seal.

10. The lubricant pump of claim 9, wherein the retaining member includes an air passage extending through the retaining member and configured to allow air to pass around the ball.

11. The lubricant pump of claim 9, wherein the bore includes an annular groove proximate the top side of the actuator and wherein the first seal is disposed within the annular groove.

12. The lubricant pump of claim 9, wherein the seal is a one-way seal.

13. The lubricant pump of claim 9, wherein the ball is configured to move in reaction to a lubricant level such that the lubricant forces the ball onto the seal.

14. The lubricant pump of claim 8, and further comprising:
a seal extending from an outer circumferential edge of the actuator and abutting the side wall of the housing, wherein the seal is configured to prevent lubricant from flowing from the lower portion to the upper portion around an outer circumferential edge of the actuator.

15. An actuator configured to be disposed in a lubricant reservoir and divide an interior of the lubricant reservoir into an upper chamber and a lower chamber, the lower chamber configured to store lubricant, the actuator further configured to move within the lubricant reservoir relative a housing of the lubricant reservoir, the actuator comprising:
a top side configured to be oriented towards the upper chamber;
a bottom side disposed opposite the top side and configured to be oriented towards the lower chamber;
a bore extending through the actuator between the top side and the bottom side;
a seal disposed within the bore proximate the top side;
a retaining member extending about the bore proximate the bottom side; and
a ball disposed at least partially within the bore between the retaining member and the seal, wherein the ball is movable between a first position, where the ball abuts the retaining member, and a second position, where the ball abuts the seal;

wherein when the ball is in the first position a flowpath through the bore is open such that air can pass around the ball and through the bore from the bottom side to the top side as the lubricant reservoir is filled with lubricant, and air can pass through the bore around the ball from the top side to the bottom side when lubricant is dispensed from the lubricant reservoir; and wherein when the ball is in the second position the ball forms a leaktight seal within the bore such that lubricant cannot flow through the bore.

16. The actuator of claim 15, wherein the retaining member includes an air passage extending through the retaining member and configured to allow air to pass through the bore when the ball is in the first position.

17. The actuator of claim 15, wherein the bore includes an annular groove extending about the bore proximate a top side of the actuator, wherein the seal is disposed within the annular groove.

18. The actuator of claim 15, wherein the seal is a one-way seal.

19. The actuator of claim 15, wherein the bore includes an upper opening having a first diameter and a lower opening having a second diameter, wherein the first diameter is smaller than the second diameter.

20. The actuator of claim 15, wherein the ball comprises a hollow sphere.

21. An actuator configured to be disposed in a lubricant reservoir and divide an interior of the lubricant reservoir into an upper chamber and a lower chamber, the lower chamber configured to store lubricant, the actuator further configured to move within the lubricant reservoir relative a housing of the lubricant reservoir, the actuator comprising:
- a top side;
- a bottom side;
- a bore extending through the actuator between the top side and the bottom side, wherein the bore includes an upper opening having a first diameter and a lower opening having a second diameter, and wherein the first diameter is smaller than the second diameter;
- a seal disposed within the bore proximate the top side;
- a retaining member extending about the bore proximate the bottom side; and
- a ball disposed at least partially within the bore between the retaining member and the seal, wherein the ball is movable between a first position, where the ball abuts the retaining member, and a second position, where the ball abuts the seal;

wherein when the ball is in the first position a flowpath through the bore is open such that air can pass through the bore from the bottom side to the top side as the lubricant reservoir is filled with lubricant, and air can pass through the bore from the top side to the bottom side when lubricant is dispensed from the lubricant reservoir; and wherein when the ball is in the second position the ball forms a leaktight seal within the bore such that lubricant cannot flow through the bore.

* * * * *